United States Patent [19]
Dahlin

[11] Patent Number: 5,941,665
[45] Date of Patent: Aug. 24, 1999

[54] WEB STRAP HOLD DOWN SYSTEM

[76] Inventor: Frederick R. Dahlin, 9243 Broken Timber Way, Columbia, Md. 21045

[21] Appl. No.: 08/978,050

[22] Filed: Nov. 25, 1997

[51] Int. Cl.[6] ........................................................ B60P 7/08
[52] U.S. Cl. .................................. 410/20; 410/10; 410/12
[58] Field of Search .................................... 410/9, 10, 11, 410/12, 19, 20, 21, 23, 50, 97, 100; 248/499; 24/68 CD, 265 CD

[56] References Cited

U.S. PATENT DOCUMENTS

| | | | |
|---|---|---|---|
| 1,770,798 | 7/1930 | Nicholson . | |
| 1,934,841 | 11/1933 | Copony . | |
| 2,023,972 | 12/1935 | Otis . | |
| 2,386,836 | 10/1945 | Blagden | 410/21 |
| 3,668,740 | 6/1972 | Pearson | 410/97 X |
| 3,820,817 | 6/1974 | Harold | 410/23 |
| 4,371,298 | 2/1983 | Van Iperen | 410/20 X |
| 4,479,746 | 10/1984 | Huber | 410/21 |
| 4,611,961 | 9/1986 | Van Iperen et al. . | |
| 4,659,266 | 4/1987 | Thelen et al. . | |
| 4,786,223 | 11/1988 | Crissy et al. . | |
| 4,960,353 | 10/1990 | Thorndyke . | |
| 4,993,898 | 2/1991 | Klahold | 410/12 |
| 5,011,347 | 4/1991 | Bullock . | |
| 5,106,245 | 4/1992 | Fritz et al. . | |
| 5,330,148 | 7/1994 | Floyd . | |
| 5,584,622 | 12/1996 | Dickerson, Sr. . | |
| 5,586,849 | 12/1996 | Kissel et al. . | |

FOREIGN PATENT DOCUMENTS 311543 4/1989 European Pat. Off. ................. 410/10

*Primary Examiner*—Stephen T. Gordon
*Attorney, Agent, or Firm*—Rosenberg, Klein & Bilker

[57] ABSTRACT

A hold down system (100) for securing a vehicle (10) to a transporter (11) includes at least one hold down device (12) for each wheel (13) of the vehicle (10). The hold down device (12) includes a short strap (15) having two end loops (16) and a long strap (14). The extremities (18, 19) of the long strap (14) pass through the end loops (16) of the short strap (15) and the ends (20, 21) of the long strap (14) are attached and tightened to the transporter (11) so that the harness loop (29) formed by the central portion (17) of the long strap (14) and the short strap (15) encircles a portion of the wheel (13) and secures such to the transporter (11). Each wheel (13) of the vehicle (10) may be individually secured to the transporter to stably maintain the position of the vehicle on the transporter (11) while it is in transit.

21 Claims, 4 Drawing Sheets

WEB STRAP HOLD DOWN SYSTEM

FIELD OF THE INVENTION

The present invention relates to a hold down system for securing a wheel of a motor car to a transporter. More particularly, this invention is directed to a web strap hold down system for strapping each wheel/tire assembly to a flat bed of a truck, ensuring the secure transportation of the vehicle with no damage to the undercarriage, brake lines or suspension. Still further, this invention is directed to a hold down system having a first strap with loops coupled to opposing ends thereof and positioned to extend across an outer face of a tire, and a second strap wrapped around a rear face of the tire having opposing ends crossing through the loops of the first strap and then releasably coupled to a supporting platform.

BACKGROUND OF THE INVENTION

DESCRIPTION OF THE PRIOR ART

It is known, that vehicles which are transported on transporters have to be secured reliably to a generally flat, horizontal surface of the transporter. It is of the essence for the vehicle service industry to use inexpensive yet secure transporters and associated equipment for securing vehicles to transporters that do not cause damage to the vehicle being transported.

A variety of hold down systems using different materials for immobilizing vehicles during shipment have been developed. The best prior art known to Applicant include U.S. Pat. Nos.: 5,330,148; 4,611,961; 5,584,622; 4,786,223; 2,023,972; 4,659,266; 1,770,798; 5,586,849; 5,011,347; 4,960,356; 5,106,245; and 1,934,841.

U.S. Pat. No. 2,023,972 describes the assembly which is formed by a loop formed by a flexible member, such as chain, from which extend a pair of attachment members. The distal ends of the attachment members are coupled to turn buckles for tensioning the hold down harness. The loop embraces a mounted tire of the vehicle, and upon being tensioned by the attachment members anchors the vehicle to the platform. However, the loop is not tightened around the vehicle's tire and the attachment members are secured within the plane of the vehicle's tires.

As opposed to using chains for anchoring vehicles to supporting platforms, it is preferred to manufacture hold down devices from straps in order to maintain acquisition costs reasonable and to avoid excessive investment in equipment employed in the vehicle service industry. Materials for making such straps are strong and durable, while maintaining flexibility and longevity. These materials are also inexpensively fabricated and stitched together. Also, an important advantage of strap construction over chains is that straps slide easily over one another, whereas chains frequently bind and catch on one another.

Wheel hold down devices made from straps are described in many patents. For instance, U.S. Pat. No. 5,330,148 is directed to a wheel tie down device for securing the wheel of a trailered vehicle to the trailer. The harness is defined by a lasso member having a D-ring on one end through which the free end passes to form a lasso handle. A tether member attaches to the lasso loop by means of a slip loop, a distal end of the tether member is provided with a hook for engagement with the eye of the trailer bed. The free end of the lasso handle is engaged by the winch for applying tightening forces to the harness. Additionally, a cross member spans the lasso loop to attach to the opposing sides thereof. Although constituting a certain improvement, the system described in this '148 Patent, does not prevent tires from undesirable displacement in direction perpendicular to the plane of the tire, since the lasso handle and the tether member are positioned in the plane of the tire. Being in the plane of the tire, makes the assembly more likely to cause damage to the vehicle. Additionally, it is essential that the cross member be positioned substantially centrally of the lasso loop, since any displacement of the cross member from its central position, may cause the lasso loop to slip off the tire, thereby failing to anchor the tire in place. Disadvantageously this hold down device needs three straps: the cross member, the lasso member, and the tether member.

A wheel harness for securing a motor vehicle to a support structure is described in U.S. Pat. No. 4,611,961. The harness is formed by a first hook strap, a second hook strap, a connecting section and a lashing strap. The first and second straps are looped about the wheel, while the lashing strap is provided with a loop for connecting to an anchor ring on the platform and tightened utilizing a buckle, which may be aided with a ratchet tool. This system is somewhat complicated and each wheel of a vehicle transported must be secured to the platform. That securement is by a single lashing strap, which certainly does not provide a sufficient anchoring action for securing the wheel of the vehicle to the platform.

The same problem is associated with the tie down device for a vehicle described in U.S. Pat. No. 5,584,622. In this system the tie down device is formed by a first strap having a loop formed on a first end thereof. At a certain distance D1 from this loop, a second strap is secured to extend substantially orthogonally from the first strap. The second strap is provided with a second loop at the distal end thereof. In use, the free end of the first strap is wrapped about the tire to pass through the loop on the first end, while the second strap passes transversely over the tire, the first strap also passing through the second loop. The free end of the first strap is then tensioned utilizing a ratchet mechanism.

As discussed above, the prior art systems for tie down of vehicles to a transporter platform suffer from a number of deficiencies, such as employing excessive structures, requiring a complex arrangement of straps around the vehicle's tires, and are prone to causing damage to the vehicle's tires, body, undercarriage, brake lines, and suspension components. It would, therefore, be highly desirable to have a device for securing vehicles to transporters that conveniently straps one or more wheels of the vehicle to the flat bed of a transporter and is designed to ensure that no damage to the vehicle could take place.

SUMMARY OF THE INVENTION

It is therefore an object of the present invention to provide a wheel hold down device that is efficient, inexpensive, convenient in use, requires no significant modification to a transporter, and uses a minimal number of parts.

It is another object of the present invention to secure a vehicle on a transporter in a simple and inexpensive manner without connecting any metal chains, cables, or hooks to the frame or body of the vehicle.

It is a further object of the present invention to provide a method for securing a vehicle onto a transporter that is quick and easy, and which will work with any size vehicle.

It is still another object of the invention to provide a wheel hold down device which easily adjusts for wheel size while being tightened thereover, thus avoiding a separate adjustment operation.

It is still an object of the present invention to provide a wheel hold down device which attaches to a transporter at two longitudinally spaced points of the transporter that are out of the plane of a wheel (tire), thereby providing a system of forces applied to each wheel of a carried vehicle to provide optimum anchoring of the vehicle.

In accordance with the teaching of the present invention, a hold down system for securing a vehicle to a supporting platform includes a hold down device for application to at least one of the wheels of the vehicle. The hold down device comprises a first strap which has two loops respectively coupled to opposing ends thereof, and a second strap which has two opposing ends releasably secured to longitudinally spaced portions of the supporting platform. Each of the ends of the second strap is provided with attaching means. The second strap is wrapped around a rear face of the tire with each of the opposing ends passing through a respective one of the end loops of the first strap for substantially encircling a portion of the tire.

It is important, that the first strap have a stiffened portion disposed between the two end loops thereof. In particular, the first strap is a polyester strap sewn lengthwise with a 3-ply portion extending between the loops, with the length of the first strap being shorter than the diameter of the vehicle tire.

At least one end of the second strap has a distal end portion folded over and secured on to itself to define an integrally formed loop. The folded over portion is sewn with stitches placed in a substantially square area, preferably with approximate dimensions of 1½×1½ inch in a zig-zag or crossed pattern, which includes preferably at least 12 rows of at least 10 evenly spaced identical stitches in each of the rows.

It is of importance, that the ends of the second strap extend from the plane of the wheel. In that way, once the first and second straps have been placed on the vehicle's wheel, and both extremities of the second strap are attached to the attachment points of the transporter and tensioned a stable system of forces is created which holds the wheel down to the platform of the transporter.

DETAILED DESCRIPTION OF THE PREFERRED EMBODIMENT

Figure 1:
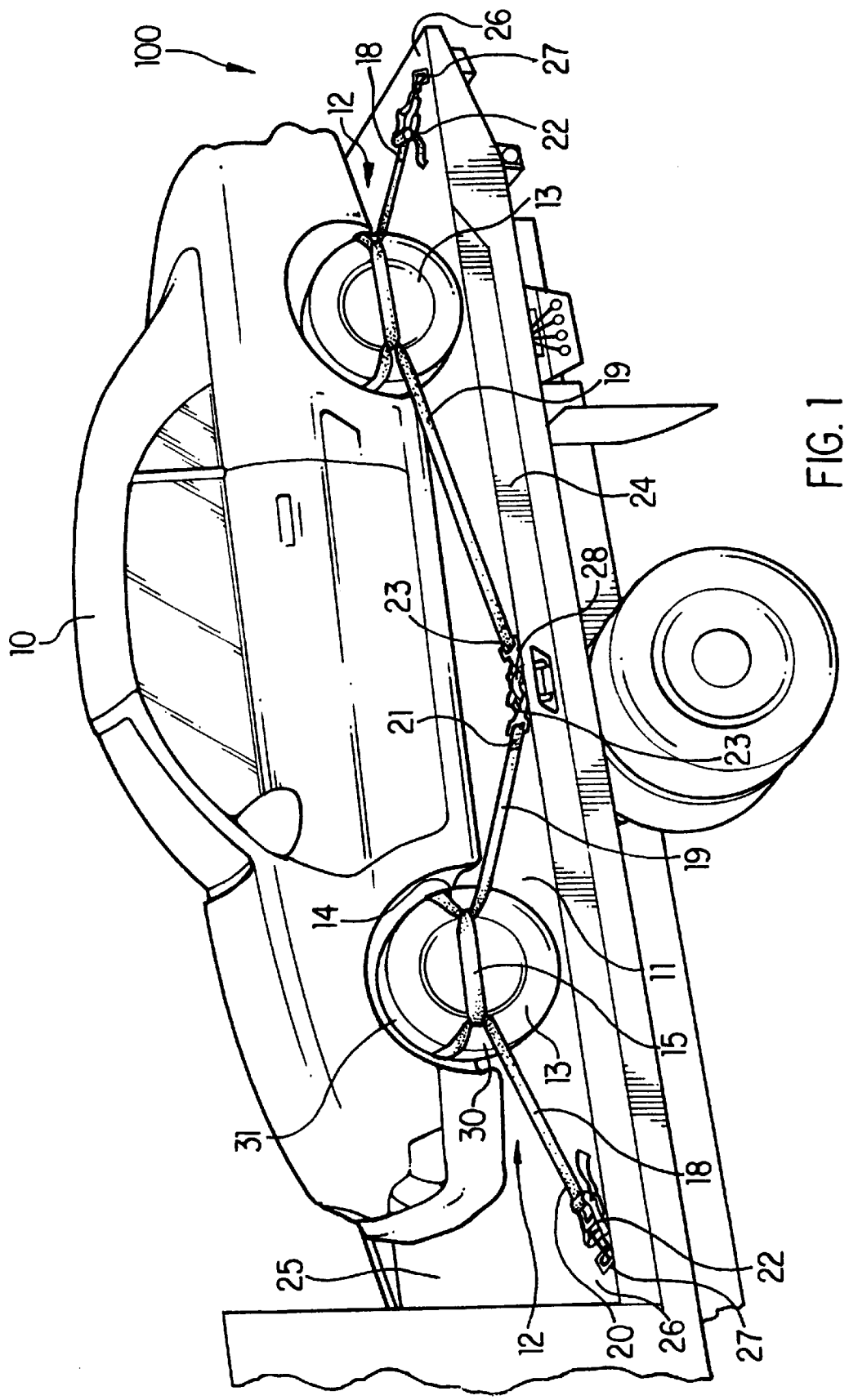
FIG. 1 is a prospective view of a vehicle carried on the flat bed platform of the transporter, with each wheel individually anchored to the platform by the web strap hold down device of the present invention.
Figure 2:
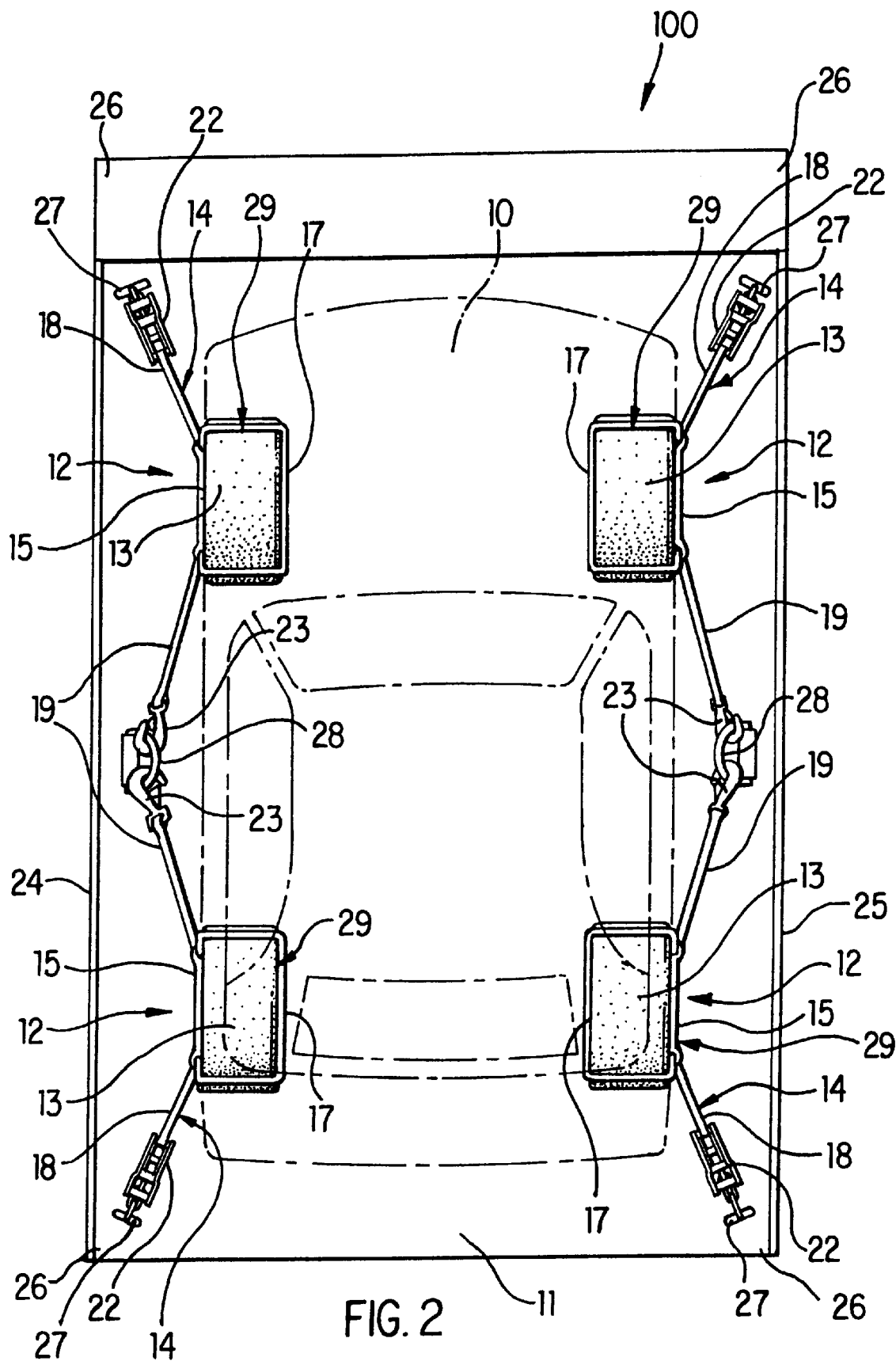
FIG. 2 is a top view of the vehicle anchored to the platform of the transporter by the web strap hold down system of the present invention.

Referring to FIGS. 1 and 2, a vehicle (automobile) 10 is secured to a supporting platform 11 by a hold down system 100 which includes at least one hold down device 12. Securement is maximized when each wheel 13 of the vehicle 10 is provided with a hold down device 12. As used herein, wheel 13 refers to the combined pneumatic tire and wheel on which the tire is mounted. Each hold down device 12 is a system of two web straps 14 and 15 used to secure the vehicle 10 on a roll back type tow truck or trailer by encircling a portion of the tire 13 of the vehicle 10 with web straps 14 and 15.

Figure 3:
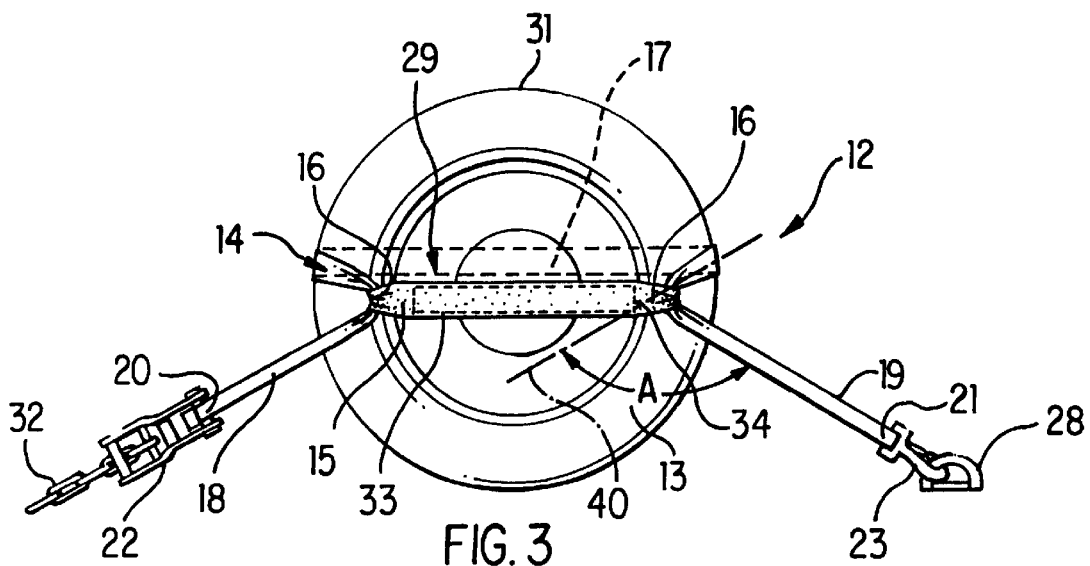
FIG. 3 is a front elevation view schematically showing a single wheel of a vehicle anchored by the web strap hold down device of the present invention.

As best shown in FIGS. 1-3, each hold down device 12 includes a long web strap 14 coupled on opposing ends to the supporting platform 11, and a short web strap 15 having a loop 16 coupled on each of two opposing ends thereof. As best shown in FIGS. 1 and 3, the short strap 15 has a length dimension that is shorter than the outside diameter of an automobile tire. By forming the short strap 15 with a length in the approximating range of 12 to 18 inches, strap 15 will be shorter than the outside diameter of conventional automotive tires currently used in the United States.

The long strap 14 has a central portion 17 and two extremities 18 and 19 extending from the central portion 17 in opposite directions. The extremity 18 has an end 20, while the extremity 19 has an end 21. A web ratchet 22 is coupled to the end 20 of the extremity 18 to provide attachment to the supporting platform 11. A hook 23 with a safety latch is provided at the end 21 of the extremity 19 for attaching that end to supporting platform 11. The web ratchet 22 and the hook 23 constitute the means by which the hold down device 12 is secured to the supporting platform 11 at attachment points formed thereon adjacent opposing sides of the platform 11. Other attachment devices can be utilized to releasably secure the long strap 14 to platform 11 without departing from the inventive concepts embodied herein.

The supporting platform 11 has two opposite sides 24 and 25 and corners 26. The attachment points of the supporting platform 11 are positioned at each of the corners 26 and substantially centrally at each of opposite sides 24 and 25. Key hole slots 27 may be provided at each of the corners 26 of the supporting platform 11, while the central attachment point of each side 24 and 25 may have a D-ring 28 positioned substantially centrally to the opposite sides 24 and 25. Alternatively, a pair of D-rings 28 may be positioned on each side of the center of the sides 24 and 25. All of the attachment points may be D-rings or all may be formed by slotted openings or other types of attachment devices, thereby affecting the type of attachment of the ends of strap 14 and the type of attachment of web rachet 22.

Once the vehicle 10 is positioned on the supporting platform 11 between the opposite sides 24 and 25 thereof with the plane of the wheels 13 being disposed between the respective planes defined by the attachment points 27 and 28 on each side of the platform 11, the hold down device 12 is put on at least one of the wheels 13. The short strap 15 is positioned to extend across an outer face of the tire, and the long strap 14 has its extremities 18 and 19 passed through both end loops 16 of the short strap 15. The central portion 17 of strap 14 is wrapped around a rear face of the tire and together with strap 15 forms a harness loop 29 which encircles a portion of the wheel 13, above the center 30 and below the top 31 thereof. The hook 23 on the end 21 of the extremity 19 is latched on the D-ring 28, while the other end 20 of the extremity 18 of the long strap 14 is inserted into the web ratchet 22 which is then attached to the supporting platform 11 at the corner 26 and is used to tighten (tension) the assembly of the hold down device 12. After passing through the loops 16, each extremity 18, 19 is folded over the associated loop 16 to extend obliquely, in an opposite direction, from the plane of wheel 13 to the attachment points for wheel where the hook 23 and the web ratchet 22 are attached to the supporting platform 11. Of critical importance is the fact that the short strap 15 is of a length that is less than the outside diameter of wheel 13, the extremities 18, 19 thereby extend outwardly from the outer face of wheel 13 to remain clear of the body and undercarriage of vehicle 10.

Since the points of attachment to the supporting platform 11 are longitudinally spaced from wheel 13 and out of the plane thereof, then when the hold down device 12 is tightened (by means of tightening the web ratchet 22), the extremities 18, 19 of long strap 14 fold over the respective loops 16 and extend at an angle A, at least 90° from the reference line 40, in a different direction. These folds lock the harness loop 29 formed by the central portion 17 of the long strap 14 and the short strap 15, in place, and impedes the harness loop 29 from sliding along the length of the long strap 14. The locking of the harness loop 29 also prevents the harness loop 29 from sliding off the wheel 13. Additionally, by securing the opposing ends of strap 14 to the attachment points that are longitudinally spaced from wheel 13 and disposed out of the plane of the wheel, the use of multiple hold down devices 12 provides force vectors that ensure that the wheels 13 of the vehicle 10 will not roll during transport. Further, the use of two attachment points for each hold down device 12 of hold down system 100 provides multiple levels of redundancy.

Figure 4:
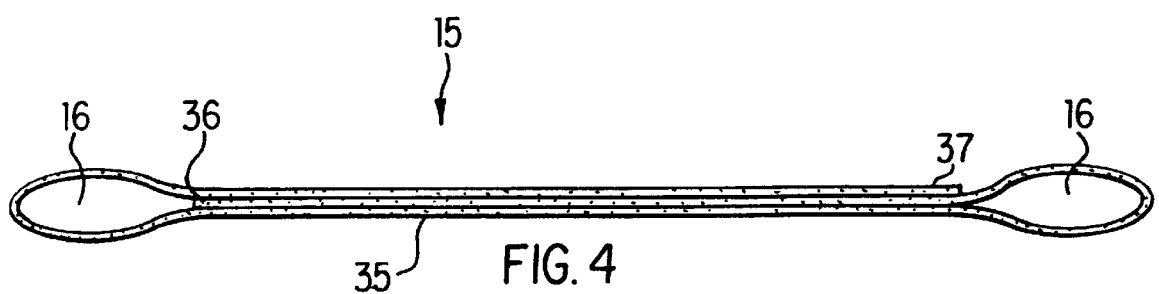
FIG. 4 is a side view of the first strap of the present invention explicitly showing the construction of two end loops and a 3-ply stiffened portion therebetween.

It is important that short strap 15 be strong, substantially inelastic, and sufficiently stiff to extend across the outer face of the wheel 13 without folding or bending. As shown in FIG. 4, the short strap 15 is a multiply strap, and in particular is formed with 3-plies between the loops 16. The multiple plies of the web which form short strap 15 are secured to each other. In one working embodiment, the 3-plies of strap 14 are secured by lengthwise stitching 33 extending on opposing sides thereof. At opposing longitudinal ends of the lengthwise stitching 33 transverse stitching 34 may also be provided. Since the short strap 15 is pulled in the longitudinal direction thereof, the 3-ply lengthwise sewn structure is essential to the strength and durability of the hold down system. Short strap 15 may be formed from a longitudinally extended strip of material having opposing end portions 36 and 37 folded over in opposite directions to overlay the central portion 35 and each other, with a region around the folds not overlapping the central portion 35 to form the loops 16.

Both long and short straps 14 and 15 are made from a substantially inelastic material, such as a woven polyester with a minimum work load limit of 4,000 lbs. As will be appreciated by those skilled in the art, work load limit is defined as ⅓ of the breaking strength of the material. Polyester is chosen because it stretches less than other webbings formed of synthetic materials, such as nylon. The web can be of any width as long as it has the sufficient work load limit, with a 2 inch width being the most common and widths of 3 or 4 inches also being appropriate.

Figure 5:
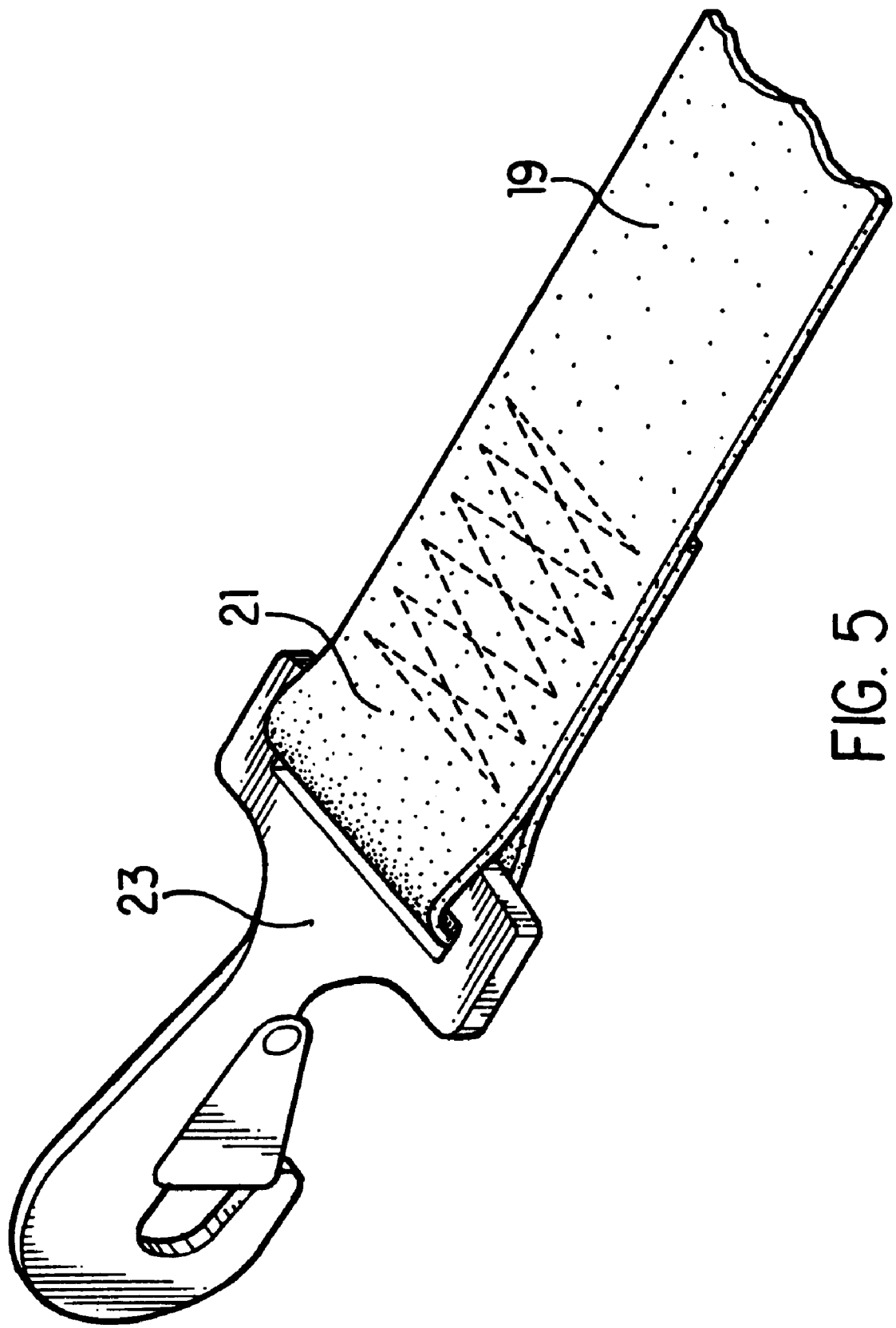
FIG. 5 is a perspective view of an end section of the second strap of the device of the present invention, explicitly showing the preferred pattern of the stitching.

As best shown in FIG. 5, the hook 23 is secured to the end 21 of the extremity 19 of the long strap 14. The end 21 is folded over and secured to form a loop through an opening in hook 23. The folded end may be sewn according to specifically designed pattern. The sewing of the web material should be done in a manner where the webbing fails under load before the stitching. On a 2 inch web, it has been found that a crossed or zig-zag pattern of 12 rows, with at least 10 evenly spaced stitches in each row, arranged in a square area provides the necessary strength. In one working embodiment, the square area has sides of approximately 1½ inches for a 2 inch web.

It will be appreciated by those skilled in the art that tires come in all different sizes, while the intention of the present invention is to have a universal hold down device 12 for all sizes of tires. Therefore, the dimensional range for the length of short strap 15 may fall within the approximating range of 12 to 18 inches, so that the short strap 15 will not be greater than the outside diameter dimension of the wheel 13. The long strap 14 typically has an approximate length of 12 feet, but may be longer or shorter to suit the dimensions of the bed of the transporting vehicle. The length of the long strap 14 accommodates the length of roll back beds used for transporting cars, which beds fall within the range of 17–22 feet. The 12 foot length of the long strap 14 gives enough length to locate the vehicle 10 being transported properly on the supporting platform 11 and also provides enough strap length to extend around wheel 13 and on to the ratchet 22 for tightening.

The ratchet 22 may be a conventional type web ratchet. In order to attach the web ratchet 22 to a respective key hole slot 27 at the corner 26 of the supporting platform 11, a length of chain 32 secured to ratchet 22 and extending therefrom drops into the key hole slot 27 of the supporting platform 11 and is releasably engaged therein. Alternatively, a hook may provide securement of ratchet 22 to an attachment point on supporting platform 11. Similarly, on the other end of the strap 14 a latched hook 23 may be used to hook to the D-ring 28. In place of hook 23, a length of chain to be engaged within a key hole slot, or any common releasable coupling device known to those skilled in the art.

As will be appreciated by those skilled in the art, that the system of the present invention does not need major modifications to the support platform 11. If not already so equipped, roll back truck bed can have D-rings and/or key hole slots easily added. A D-ring or a pair of D-rings may be attached somewhere near the center of the bed, adjacent the sides thereof. Each D-ring may be bolted or welded to the supporting platform 11. Since the width of the vehicle 10 that is being transported is narrower than the width of the supporting platform 11, the attachment points are easily located outside of the plane of the vehicle's wheels 13. Therefore, when the long strap 14 is attached to corresponding attachment points, the extremities 18 and 19 form an effective system of force vectors applied to each wheel 13 of the vehicle 10 to reliably and efficiently anchor each of the wheels 13, and accordingly the vehicle 10 as a whole, to the supporting platform 11. An additional advantage of this arrangement, when the extremities 18 and 19 are pulled away from the vehicle, is that such facilitates the strap 14 in clearing the vehicle's fenders, even on vehicles having very minimal clearance between the tires and their associated fenders.

In use, the extremities of the long strap 14 pass through a respective end loop 16 of the short strap 15, thereby forming a harness loop 29 which encircles a wheel 13. The loop thus formed is positionable anywhere along the length of long web strap 14 to thereby accommodate vehicles of different wheelbase or transporting vehicle beds of different sizes. The hook 23 is attached to the D-ring 28 in the center of the respective side 24, 25 of the supporting platform 11. The web ratchet 22 is attached to the key hole slot 27 at the respective corner 26 of the supporting platform 11 and is tightened. The tightening of strap 14 tensions the extremities 18 and 19 towards the attachment points, thereby locking the harness loop 29 on the wheel 13 and anchoring each of the wheels of the vehicle 10 to the supporting platform 11 for transporting purposes. Since the harness loop 29 is not applied to any part of a car, except for the upper portion of the wheels, no damage to the undercarriage, brake lines, or suspension of the vehicle 10 can take place. The system of the present invention also eliminates the chance of a vehicle 10 being scratched, unlike the situations when the roll back's winch is to be used to secure the vehicle being towed to the transporter. As short strap 15 has a length that is less than the diameter of the vehicle's wheel, the extremities 18 and 19 of long strap 14 remain clear of the transported vehicle's fenders and thereby avoid causing damage thereto. The strap system can be applied without the operator climbing or reaching under the vehicle being secured, and is well suited for use with vehicles having very low ground clearance or vehicles with fragile fascias, dams, or ground effect components.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described. Certain features may be used independently of other features and in certain cases, particularly location of elements may be reversed or interposed, all without departing from the spirit or scope of the invention as defined in the dependent claims.

What is claimed is:

1. A hold down system for securing at least one tire of a vehicle to a supporting platform including at least one hold down device, comprising:
   a first strap having loops coupled on opposing ends thereof for extension across an outer face of a tire; and,
   a second strap having a pair of opposing ends adapted for releasable securement to longitudinally spaced portions of the supporting platform, each of said opposing ends of said second strap passing through a respective one of said end loops of said first strap and having sufficient length for wrapping around a rear face of the tire and thereby substantially encircling a portion of the tire with said first and second straps.

2. The hold down system as recited in claim 1 further comprising four of said hold down devices, each of said hold down devices anchoring a respective one of four tires to the supporting platform.

3. The hold down system as recited in claim 1 where said first strap has a length dimension less than an outside diameter of the vehicle's tire.

4. The hold down system as recited in claim 1 where said first strap includes means for stiffening a portion thereof disposed between said end loops.

5. The hold down system as recited in claim 4 where said stiffening means includes a plurality of strap plies secured one to another between said end loops.

6. The hold down system as recited in claim 5 where said plurality of strap plies is defined by 3 strap plies.

7. The hold down system as recited in claim 5 where said stiffening means includes lengthwise stitching joining said plurality of strap plies.

8. The hold down system as recited in claim 1 where said first strap is formed by a longitudinally extended strip of material having opposing end portions, each of said end portions of said strip being folded in opposite directions and respectively disposed in overlaying relationship with a central portion of said strip and each with respect to the other for integrally forming said two end loops and a stiffened central portion therebetween.

9. The hold down system as recited in claim 1 where each end of said second strap passes through a respective one of said end loops of said first strap and is folded thereover to extend obliquely in an opposing direction.

10. The hold down system as recited in claim 1 further comprising a ratchet releasably secured to one of said ends of said second strap for coupling to the supporting platform and applying a tensioning force to said second strap.

11. The hold down system as recited in claim 1 where at least one of said ends of the second strap has a distal end portion folded over and secured on to itself to define an integrally formed loop.

12. The hold down system as recited in claim 11 where said folded over distal end portion of said second strap is secured by a zig-zag pattern of stitching.

13. The hold down system as recited in claim 12 where said zig-zag pattern is disposed in a substantially square area.

14. The hold down system as recited in claim 13 where said substantially square area has sides approximating 1½ inches.

15. The hold down system as recited in claim 12 where said zig-zag pattern of stitching is arranged in a pattern having at least 12 rows with at least 10 evenly spaced stitches in each of said rows.

16. The hold down system as recited in claim 1 where each of said first and second straps are made of a substantially inelastic material.

17. The hold down system as recited in claim 1 where said first strap is adjustably longitudinally positionable with respect to said opposing ends of said second strap.

18. A hold down system for securing a vehicle to a transport vehicle, the transport vehicle having a plurality of longitudinally spaced attachment points adjacent opposing sides thereof, said hold down system including a hold down device for each tire mounted to the vehicle, said hold down device comprising:
   a first strap having loops coupled on opposing ends thereof and being positioned for extension across an outer face of a tire, said first strap having a length dimension less than an outside diameter of the tire;
   a second strap having a pair of opposing ends adapted for releasable securement to a respective pair of the plurality of longitudinally spaced attachment points, each of said opposing ends of said second strap passing through a respective one of said end loops of said first strap and having sufficient length for wrapping around a rear face of the tire and thereby substantially encircling a portion of the tire with sail first and second straps, each end of said second strap being folded over a respective loop after being passed therethrough to extend obliquely from a plane of the outer face of the tire in an opposing direction for releasable securement to the respective pair of attachment points.

19. The hold down system as recited in claim 18 where said first strap includes means for stiffening a portion thereof disposed between said end loops.

20. The hold down system as recited in claim 19 where said stiffening means includes a plurality of strap plies secured one to another between said end loops.

21. The hold down system as recited in claim 18 where said first strap is formed by a longitudinally extended strip of material having opposing end portions, each of said end portions of said strip being folded in opposite directions and respectively disposed in contiguous relationship with an opposing side of a central portion of said strip to integrally form said two end loops and a stiffened central portion therebetween.

* * * * *